July 10, 1962 C. W. MOTT 3,043,080
BLADE CONNECTION FOR MOWERS
Filed April 20, 1960 3 Sheets-Sheet 1
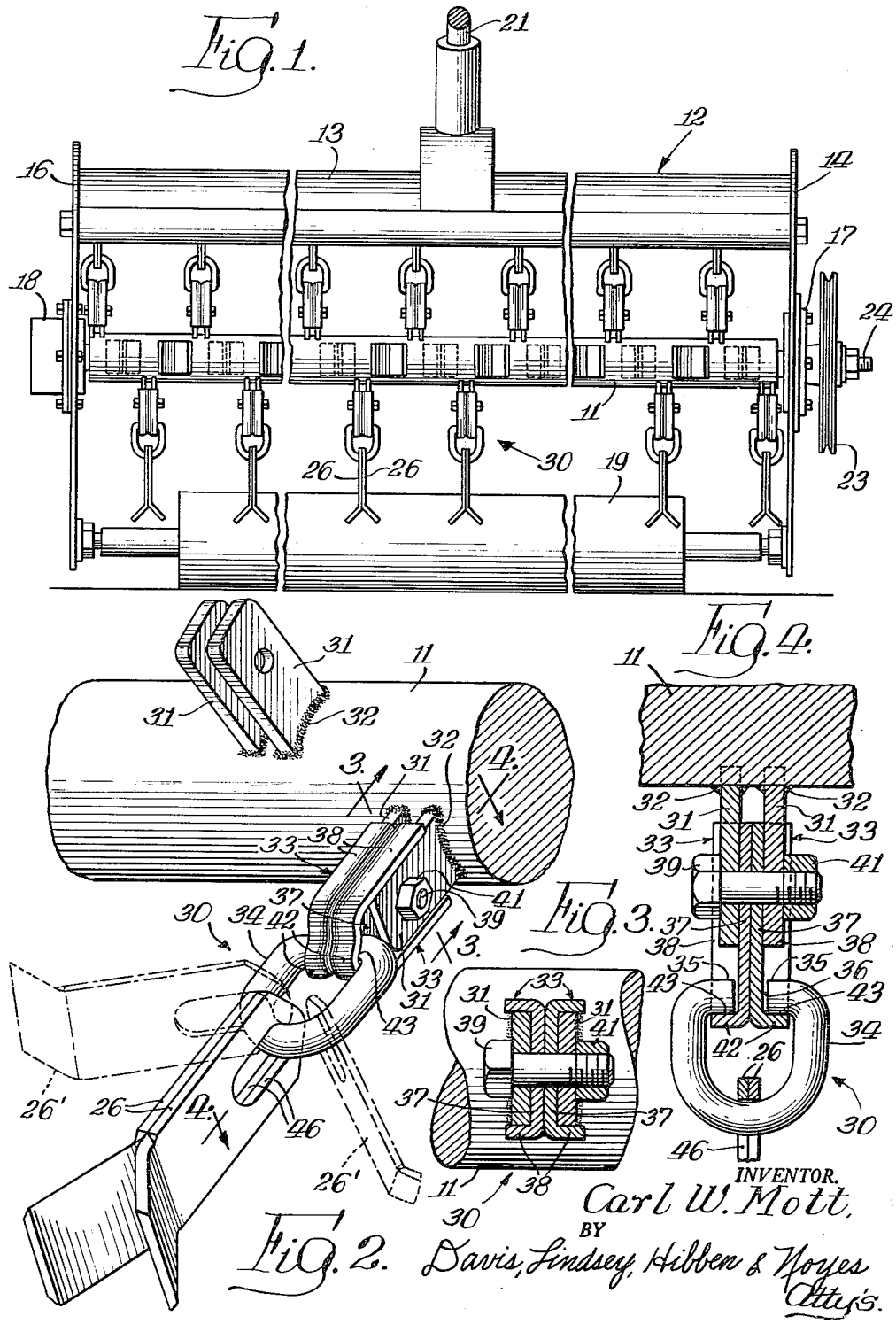
INVENTOR.
Carl W. Mott,
BY Davis, Lindsey, Hibben & Noyes
Attys.

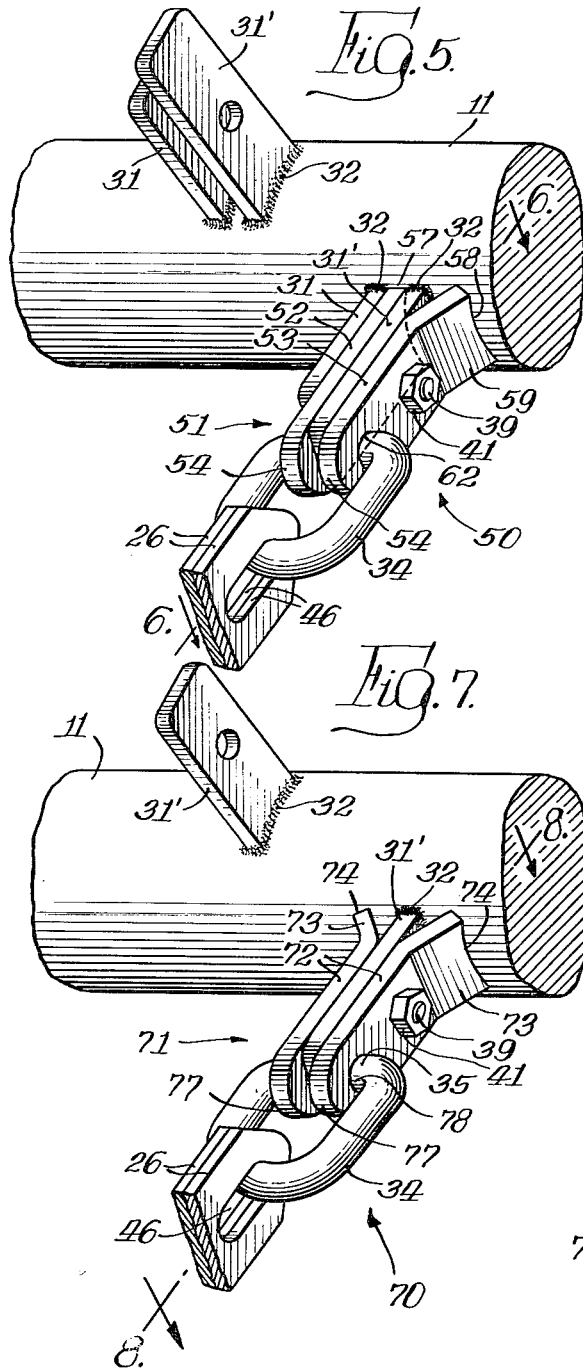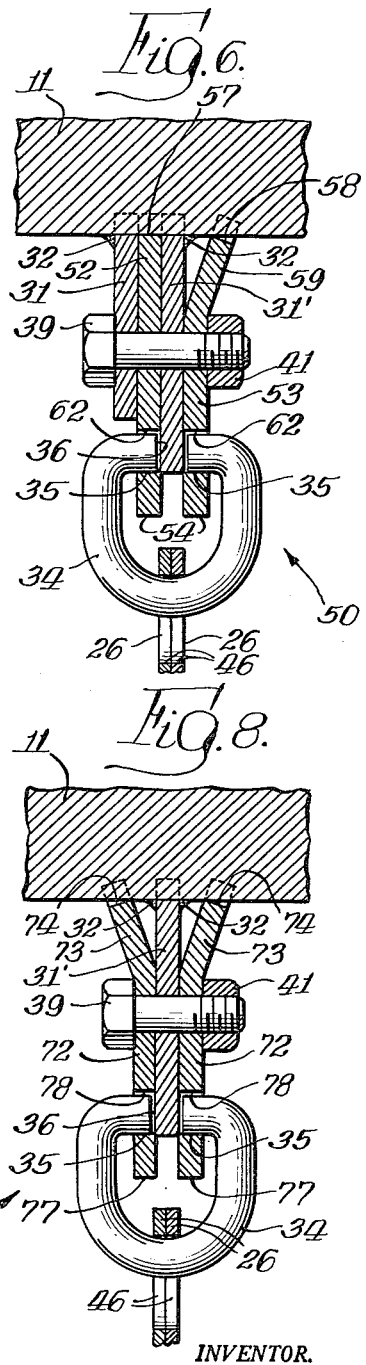

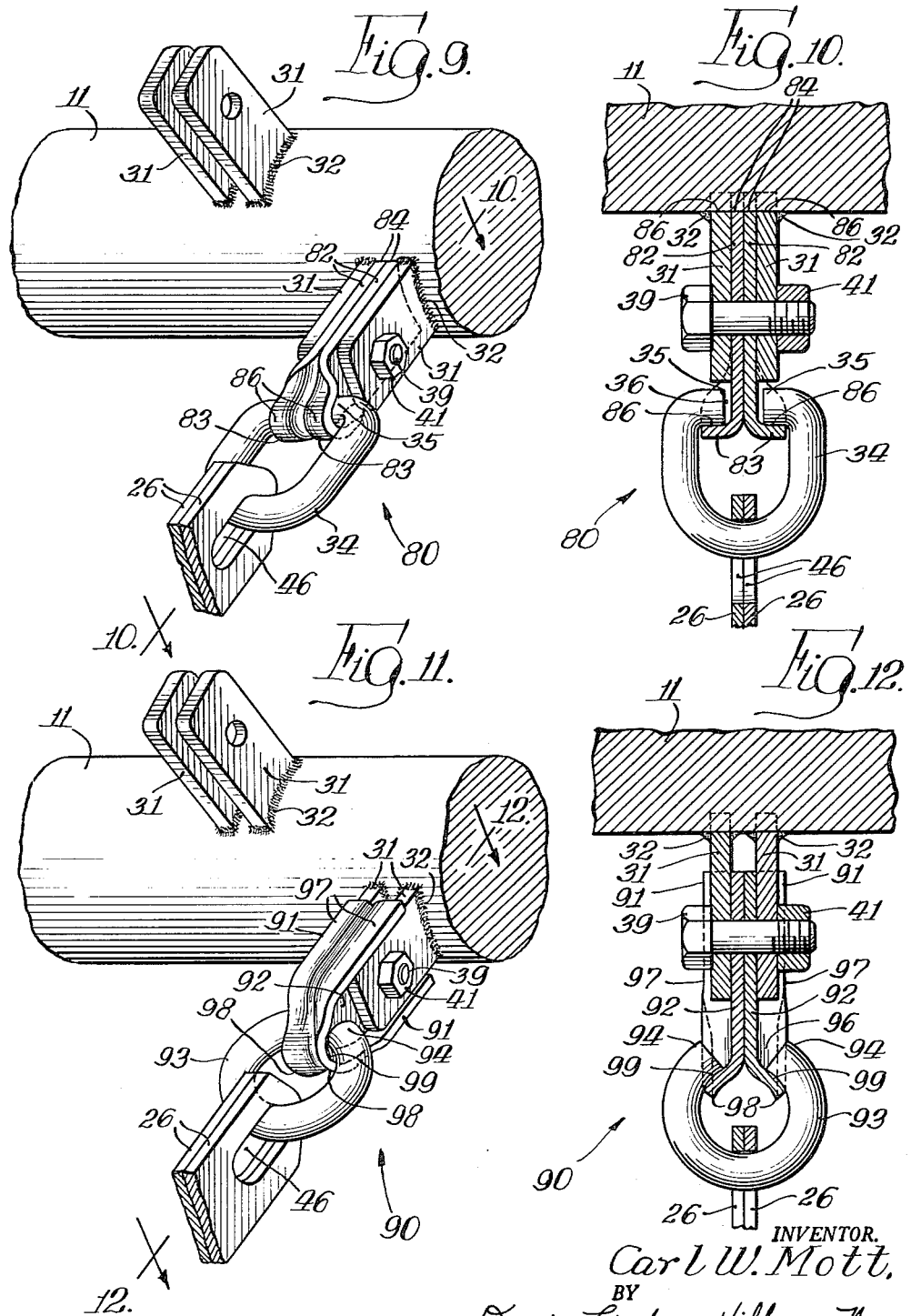

3,043,080
BLADE CONNECTION FOR MOWERS
Carl W. Mott, Lake Ozark, Mo., assignor to Mott Corporation, Brookfield, Ill., a corporation of Illinois
Filed Apr. 20, 1960, Ser. No. 23,404
21 Claims. (Cl. 56—294)

This invention relates to mowers, and more particularly to securing a plurality of blades to a rotatable shaft thereof.

A mower to which the present invention relates is of the type shown in my prior Patent No. 2,711,067, issued June 21, 1955, and includes a horizontal rotatably driven shaft extending transversely of the direction of travel. Mounted on the shaft are a plurality of axially spaced lugs extending radially therefrom, to which are loosely secured a plurality of blades or knives, the latter being adapted to extend outwardly from the lugs by virtue of centrifugal force. The means for securing the blades to the shaft should be such that the blades cannot become disconnected during operation, particularly when striking hard objects such as stones or the like, but also should be such that the blades can be readily replaced.

Accordingly, it is a general object of the present invention to provide an improved means for connecting the blades to the shaft of a mower.

Another object is to provide a blade connecting means which effectively avoids difficulties from stresses resulting from centrifugal force and impact of the blades with hard objects.

A further object is to provide an improved blade connecting means which facilitates installation and removal of the blades for purposes of inspection or replacement.

Other objects and advantages of the invention will become apparent from the following description taken in connection with the accompanying drawings, in which:

FIG. 1 is a front elevational view of a mower having blade connecting means embodying the invention.

FIG. 2 is an enlarged fragmentary perspective view of the blade connecting means shown in FIG. 1;

FIG. 3 is a fragmentary sectional view taken along the line 3—3 of FIG. 2;

FIG. 4 is a fragmentary sectional view taken along the line 4—4 of FIG. 2;

FIG. 5 is a view similar to FIG. 2 but showing another embodiment of the invention;

FIG. 6 is a fragmentary sectional view taken along the line 6—6 of FIG. 5;

FIG. 7 is a view similar to FIGS. 2 and 5 but showing a further embodiment of the invention;

FIG. 8 is a fragmentary sectional view along the line 8—8 of FIG. 7;

FIG. 9 is a view similar to FIGS. 2, 5, and 7, of still another embodiment of the invention;

FIG. 10 is a fragmentary sectional view taken along the line 10—10 of FIG. 9;

FIG. 11 is a view similar to FIGS. 2, 5, 7, and 9, of a still further embodiment of the invention; and FIG. 12 is a fragmentary sectional view taken along the line 12—12 of FIG. 11.

In FIG. 1, a mower is illustrated, of the type shown in my prior patent. The mower comprises a blade carrier in the form of an elongated horizontally disposed shaft 11 and an enclosing housing 12 that includes a generally semi-cylindrical shroud portion 13 and a pair of end walls 14 and 16 which carry bearing structures 17 and 18 for supporting the respective ends of the shaft 11. A ground engaging roller 19 may be mounted between the end walls 14 and 16 for supporting the mower, and a stabilizer rod 21 may be provided for securing the mower to a power driven vehicle (not shown). A pulley 23 is secured to a projecting end 24 of the shaft 11, outwardly of the end wall 14, for supplying power to rotate the shaft 11. A plurality of blades or knives 26, preferably in pairs, are eccentrically pivoted to the shaft 11 in axially and circumferentially spaced relation by means indicated generally at 30. It will be apparent that rotation of the pulley 23 at a sufficient speed will cause the blades 26 to swing outwardly and radially of the shaft 11 due to centrifugal force. The blade connecting means 30 provides a universal mounting for the blades and the latter are thus free to swing so that damage to the blades is avoided should they strike a solid object during a mowing operation.

A blade connecting means embodying the invention comprises generally lug means on the shaft 11, attaching means secured to the lug means, and a link for connecting the blade structure to the outer end of the attaching means. The link preferably is in the form of a loop having a gap, and the attaching means is such that it holds the gap in a predetermined position to prevent the link from spreading and increasing the width of the gap, and to prevent the link from shifting to a position where the blade means might become disengaged through the gap.

As illustrated in FIGS. 2 to 4, the blade connecting means 30 includes lug means comprising, in this instance, a pair of radially extending elements 31 in the form of flat strips, the inner ends thereof being secured to the shaft 11 as by welding 32. The blade connecting means 30 also includes attaching means comprising a pair of members 33 arranged in face-to-face relation and disposed between the lug elements 31, and a link in the form of a U-shaped loop 34 having its end portions 35 directed inwardly toward each other for coaction with the members 33. The ends 35 are thus spaced from each other and define a gap 36 therebetween.

In the present instance, each attaching member 33 is in the form of a channel having a web 37 of substantially the same width as that of the lug elements 31, and flanges 38 of sufficient width to overlap the side edges of the lug elements 31. The webs 37 are arranged back-to-back and are disposed between the lug elements 31 in sandwiched relation. In order to rigidly secure the attaching members 33 to the lugs 31 and to permit rapid installation or removal of the blades 26, a pin in the form of a bolt 39 having a retaining nut 41 is provided, the bolt 36 extending through the lugs 31 and webs 37. Thus, radial shifting of the members 33 is prevented.

As heretofore mentioned, the attaching members 33 are arranged so that their outer ends 42 project beyond the outer ends of the lugs 31, the ends 42 being formed with a pair of oppositely facing recesses defining a pair of seats 43 for engaging the link 34. For this purpose, the inwardly directed ends 35 of the link 34 are in linear alignment with each other and are disposed in the seats 43, the gap 36 thus being disposed at the inner side of the link. The gap 36 is sufficiently wide to accommodate the combined thickness of the webs 37, which relationship also prevents rotation of the link 34 in its own plane. In the case of the attaching members 33, the recesses providing the seats 43 are formed by the flanges 38 which extend around the sides and the outer ends of the end portions 42 of the members 33. The inner sides of the recesses are closed by the lugs 31.

Each pair of blades 26 is arranged in back-to-back relation and provided with elongated holes or slots 46 at their inner ends to permit their engagement with the link 34. The slots 46 serve several functions in addition to providing a connection point for the blades. Thus, the blades 26 are prevented from binding on the loop portion of the link 34 when thrown sideways from their normal back-to-back relation, such as a position 26' illustrated in dotted line in FIG. 2. The slots 46 also serve to prevent radial spreading of the ends 35 of the link 34 due to inward forces imposed on the link resulting from impact of the blades 26 with obstacles. The slots 46 thus permit the blades to move radially inwardly relative to the link 34 when such an obstacle is encountered, thereby applying the impact force against the attaching members 33 rather than against the link 34.

It will thus be apparent that by utilizing channels for the attaching members 33 and a U-shaped link 34, an improved securement of the blades is obtained, the construction and arrangement of the parts being such as to prevent accidental disconnection of the blades during operation of the mower, even when the blades strike hard objects such as stones or the like. For replacement of the blades, removal of the bolt 39 permits withdrawal of the attaching members 33 from between the lugs 31. The link 34 may then be tilted to one side of the attaching members and withdrawn along the latter. When the link 34 is thus separated from the attaching members, the blades can be swung around the link and removed through the gap. For assembling the parts, the steps are of course reversed.

In FIGS. 5 and 6, an alternate blade connecting means 50 is illustrated. In this embodiment, the link 34 is of the same construction as in the previously described form, the lug elements differing somewhat as to length. Thus, pairs of radially extending spaced lug elements 31 and 31' are secured at spaced points along the shaft 11, the lug element 31' being somewhat longer than the lug element 31. The inner ends of the lug elements are shaped to fit the shaft 11 and are preferably welded thereto as at 32. Each link 34 is in the form of a U-shaped loop having its ends 35 directed inwardly in linear alignment with each other and defining a gap 36 therebetween. The link 34 provides a mounting for a pair of blades or knives 26 at its outer end.

The attaching means, shown at 51, differs from that of the connecting means 30 and comprises a pair of elongated strip members 52 and 53 disposed in face-to-face relation with the lug 31'. Thus, the attaching member 52 is disposed between the lugs 31 and 31', and the member 53 is disposed adjacent an outer side face of the lug 31'. The spacing between the lugs 31 and 31' is such as to snugly receive the attaching member 52 therebetween. The attaching members 52 and 53 are secured to the lugs by a bolt 39, as in the first form.

In order to prevent shifting or rotation of the members 52 and 53 about the bolt 39, the former have their inner end edges 57 and 58 shaped to conform to the contour of the shaft 11. Thus, the inner end edges are curved as at 57 and 58 to fit the shaft 11, which in this instance is cylindrical. As will be seen from FIG. 6, the lugs 31 and 31' are welded to the shaft 11 only along their outer side faces. It therefore becomes apparent that the weld 32 would prevent the attaching member 53 from engaging the side face of its adjacent lug 31' in surface-to-surface relation if the inner end of the attaching member engages the shaft 11. Accordingly, the inner end of the attaching member 53 is bent out of the plane of the major portion of the member, as at 59, to avoid the weld 32. The bent portion 59 also provides a wider base for the attaching members at the shaft 11, which provides greater strength to the connection at this point.

As in the blade connecting means 30, the U-shaped link 34, with its linearly aligned inwardly directed end portions 35, is pivoted on the attaching members 52 and 53. To this end, the outer ends of the attaching members 52 and 53 extend outwardly beyond the lugs 31 and 31' and are provided with seats for receiving the inturned ends 35, the seats in this instance being in the form of a pair of transverse aligned openings 62. The openings 62 function in the same manner as the recesses which form the seats 43 in the connecting means 30. The longer length lug 31', in this instance, extends into the gap in the link 34 (FIG. 6) thereby preventing the ends 35 of the link 34 from shifting transversely of the attaching members 52 and 53 and becoming detached.

For removing the attaching members 52 and 53 from the link 34, the gap 36 in the link is at least as wide as the thickness of each of the attaching members. Thus, when the bolt 39 is removed and the attaching members are separated from the lugs 31 and 31', each attaching member may be shifted into alignment with the gap 36 and removed therethrough. When the parts are assembled, the lug 31' between the attaching members 52 and 53 holds the latter spaced apart and, since the lug 31' extends into the gap 36 of the link, the attaching members cannot be shifted along the end portions 35 of the link to the gap 36. The link 34 and the attaching members are thus held in assembled relation.

In FIGS. 7 and 8, another blade connecting means 70 is illustrated, the connecting means 70 most closely resembling the connecting means 50. The connecting means 70 differs primarily from the connecting means 50 in that it is adapted to universally connect a pair of blades or knives 26 to a single radially extending flat lug element 31', a plurality of which are disposed along the shaft 11 for the respective pairs of blades. The connecting means 70 thus comprises the lug element 31', attaching means 71 in the form of a pair of strip members 72 detachably connected to the lug 31' along each side face thereof by a bolt 39 and retaining nut 41, and a link in the form of a U-shaped loop 34 of the same construction as in the two previously described forms.

Inasmuch as only a single lug 31' is utilized in the connecting means 70, the former is secured to the shaft 11 by a weld 32 along each side face of the lug 31'. The inner ends of the attaching members 72 are accordingly bent out of the plane of the major portion of the member, as at 73, to avoid the weld 32 in the manner of the strip member 53 in the connecting means 50 and to provide a wide base for the attaching members for increased strength. The end edges, indicated at 74, of the bent portions 73 are similarly shaped or contoured for congruent engagement with the shaft 11. The attaching members 72 have their outer ends 77 provided with aligned transverse openings 78 which form seats for pivotally receiving the inwardly directed ends 35 of the link 34. As in the connecting means 50, the lug 31' is sufficiently long to extend into the gap 36 of the link 34 to prevent transverse shifting of the ends 35 of the link 34 in the openings.

In FIGS. 9 and 10, another blade connection means 80 is illustrated, which is similar to the blade connecting means 30, in that it comprises lug means in the form of a pair of spaced strip elements 31, attaching means in the form of a pair of elongated strip members 82 which are detachably secured between the lug elements 31 by a bolt 39 and nut 41, and a link in the form of a U-shaped loop 34 having inwardly directed linearly aligned end portions 35 defining a gap 36 therebetween. The attaching members 82 at their inner end edges 84 are shaped to congruently engage the surface of the shaft 11 to prevent shifting or rotation of the members 82 about the bolt 39.

To provide a connection between the link 34 and the attaching members 82, the latter at their outer ends are provided with recesses to receive the inturned ends 35 of the link. Thus, the outer ends of the attaching members 82 project beyond the lugs 31 into the gap 36 of the link 34 and each is provided with a flange 83 extending around the outer end and the sides of the end portion of the member 82. The flanges 83 therefore provide oppositely facing recesses on the attaching members, constituting seats 86 for the end portions of the link 34. The inner sides of the recesses are closed by the lugs 31 so that the end portions 35 of the link cannot become detached therefrom. When the bolt 39 is removed and the attaching members 82 are separated from the lugs 31, the end portions 35 of the link can be slid inwardly of the attaching members 82 and thus removed therefrom.

In FIGS. 11 and 12, still another blade connecting means is illustrated and designated generally by the reference numeral 90. The blade connection 90 most closely resembles the blade connecting means 30 in that it comprises lug means in the form of a pair of spaced radially extending strip elements 31, and attaching means in the form of a pair of channel members 91 having their webs 92 disposed in back-to-back relation and sandwiched between the lugs 31, the flanges of the channel, indicated at 97 overlapping the side edges of the lugs 31. The attaching members are secured to the lugs 31 by a bolt 39. In this instance, the link is in the form of a C-shaped ring 93 having inwardly directed ends 94 defining a gap 96 therebetween, the ring 93 being adapted to secure a pair of blades or knives 26 to the attaching members 91. The webs 92 extend into the gap 96 of the ring 93 and the flanges 97 extend around the outer end portions of the attaching members 91, as at 98, to form oppositely facing recesses to provide a pair of seats 99 for receiving the ends 94 of the ring 93. Since the ring 93 is C-shaped, the flanges 98 at the outer ends of the members 91 diverge outwardly to conform to the inwardly directed ends 94 of the ring 93.

When the parts are assembled, the lugs 31 close the inner ends of the recesses formed by the flanges 98 to prevent disengagement of the link 93 from the attaching members 91. When the bolt 39 is removed and the attaching members 91 are separated from the lugs 31, the link 93 may be removed from the attaching members by sliding the end portions 94 of the link inwardly along the channel of the attaching members.

I claim:

1. In a mower having a rotatably driven horizontal shaft having blade supporting lug means projecting generally radially therefrom, the combination of attaching means secured to said lug means, blade structure, and a link having a gap at its radially inner side, said link connecting the blade structure to the outer end of the attaching means, one of said means extending into said gap to prevent rotation of said link in its own plane to prevent said gap from shifting.

2. The combination of claim 1, in which said link has its end portions at said gap directed generally toward each other for pivotally engaging said attaching means.

3. The combination of claim 1, in which said attaching means is shaped to prevent shifting thereof relative to said lug means.

4. The combination of claim 3, in which the outer end of said attaching means is provided with seats for pivotally receiving and retaining the end portions of said link.

5. The combination of claim 1, in which said lug means comprises a pair of axially spaced radially extending elements, and said attaching means comprises a pair of members, at least one of which is disposed between said elements in sandwiched relation therewith.

6. The combination of claim 5, in which said members are channels having their webs back-to-back and disposed between said lug elements, the flanges of said channels overlapping the side edges of said lug elements.

7. The combination of claim 5, in which said members extend beyond said lug means and have portions at the outer ends thereof formed to provide a pair of oppositely facing recesses providing seats for receiving said end portions.

8. The combination of claim 6, in which said flanges are connected by portions extending around the outer ends of said members and forming a pair of oppositely facing recesses for receiving and retaining the end portions of said link.

9. The combination of claim 1, in which said lug means comprises at least one radially extending element in the form of a flat strip, and said attaching means comprises a pair of elongated members in face-to-face engagement with said lug element.

10. The combination of claim 9, in which said attaching members are secured to said lug element by a pin extending therethrough intermediate the ends of said attaching members and lug element.

11. The combination of claim 10, in which said attaching members have their inner end edges shaped to engage said shaft and prevent turning of said attaching members on said pin.

12. The combination of claim 10, in which the inner end edges of said attaching members are curved to fit said shaft.

13. The combination of claim 12, in which the said lug element is adapted to be welded to said shaft, and the inner end of at least one of said attaching members is bent out of the plane of the major portion to avoid said weld.

14. The combination of claim 1, in which said lug means comprises a pair of spaced flat lug elements, and said attaching means comprises a pair of strip members, one of said members being disposed in face-to-face engagement with an outer face of one of said elements.

15. The combination of claim 2, in which said lug means comprises at least one radially extending flat lug element, and said attaching means comprises a pair of strip members extending outwardly beyond said lug element and having holes in their outer ends providing seats for the end portions of said link.

16. The combination of claim 2, in which said inwardly directed end portions are in linear alignment with each other.

17. The combination of claim 12, in which said link is of U-shape with ends of the U bent toward each other.

18. The combination of claim 7, in which said recesses have their walls diverging outwardly, and said link is C-shaped with the end portions engaging said walls.

19. In a mower having a rotatably driven horizontal shaft having a pair of axially spaced blade supporting lugs projecting generally radially therefrom, the combination of blade structure having a transverse hole at the inner end thereof, a link extending through said hole and bent into a loop with the end portions turned toward each other with a gap therebetween, and attaching means comprising a pair of members extending between said lugs and rigidly secured thereto, the outer end portions of said members extending outwardly beyond said lugs and through said gap with flanges at the outer ends and sides of said end portions providing oppositely facing recesses pivotally receiving the end portions of said link, said lugs closing the inner sides of said recesses to prevent disengagement of said link.

20. In a mower having a rotatably driven horizontal shaft having a blade supporting lug projecting radially therefrom, the combination of blade structure having a transverse hole at the inner end thereof, a link extending through said hole and bent into a loop with the end portions turned toward each other with a gap therebetween, and attaching means comprising a pair of members positioned on opposite sides of said lug and rigidly secured thereto, the outer end portions of said members extending outwardly beyond said lug and having aligned transverse openings therethrough receiving the end portions of said link, the width of said gap being at least equal to the thickness of each of said members to permit the members to be inserted and withdrawn through said gap when the members are detached from said lug, said lug extending into said gap to prevent disengagement of said link from said members.

21. The combination of claim 1, in which said blade structure comprises at least one blade having an elongated slot in its inner end to receive said link, whereby the blade when moved radially inward by impact with an obstacle applies its impact force against said attaching members.

References Cited in the file of this patent
UNITED STATES PATENTS

| | | |
|---|---|---|
| 2,474,718 | Bender | June 28, 1949 |
| 2,500,914 | Sells et al. | Mar. 14, 1950 |
| 2,723,430 | Paillard | Nov. 15, 1955 |
| 2,836,023 | Caldwell | May 27, 1958 |